US012112464B2

(12) United States Patent
Levin

(10) Patent No.: US 12,112,464 B2
(45) Date of Patent: Oct. 8, 2024

(54) APPARATUS AND METHOD FOR ONBOARD STEREOSCOPIC INSPECTION OF VEHICLE TIRES

(71) Applicant: Gary B. Levin, Karnei Shomron (IL)

(72) Inventor: Gary B. Levin, Karnei Shomron (IL)

( * ) Notice: Subject to any disclaimer, the term of this patent is extended or adjusted under 35 U.S.C. 154(b) by 226 days.

(21) Appl. No.: 17/709,667

(22) Filed: Mar. 31, 2022

(65) Prior Publication Data

US 2022/0222805 A1 Jul. 14, 2022

Related U.S. Application Data

(63) Continuation of application No. 17/143,302, filed on Jan. 7, 2021, now Pat. No. 11,328,403.

(60) Provisional application No. 62/964,230, filed on Jan. 22, 2020.

(51) Int. Cl.
| | |
|---|---|
| *G06T 7/00* | (2017.01) |
| *B60W 50/14* | (2020.01) |
| *B60W 60/00* | (2020.01) |
| *G06F 3/14* | (2006.01) |
| *G06Q 30/014* | (2023.01) |
| *H04N 13/243* | (2018.01) |
| *H04N 13/254* | (2018.01) |
| *H04N 13/296* | (2018.01) |

(52) U.S. Cl.
CPC .......... *G06T 7/0002* (2013.01); *B60W 50/14* (2013.01); *B60W 60/0015* (2020.02); *G06F 3/14* (2013.01); *G06Q 30/014* (2013.01); *H04N 13/243* (2018.05); *H04N 13/254* (2018.05); *H04N 13/296* (2018.05); *B60W 2050/146* (2013.01); *B60W 2420/403* (2013.01); *B60W 2556/45* (2020.02); *G06T 2207/10012* (2013.01); *G06T 2207/30248* (2013.01)

(58) Field of Classification Search
CPC ........ G06T 7/0002; G06T 2207/10012; G06T 2207/30248; B60W 50/14; B60W 60/0015; B60W 2050/146; B60W 2420/42; B60W 2556/45; B60W 40/12; B60W 50/04; G06F 3/14; G06Q 30/014; H04N 13/243; H04N 13/254; H04N 13/296; H04N 2013/0081; H04N 13/239; G09G 2380/10; G09G 3/003; G09G 5/003

See application file for complete search history.

(56) References Cited

U.S. PATENT DOCUMENTS

| | | | | |
|---|---|---|---|---|
| 9,824,453 | B1 * | 11/2017 | Collins | G06V 20/20 |
| 9,880,382 | B1 * | 1/2018 | Tippy | B60S 1/566 |
| 10,179,487 | B1 * | 1/2019 | Larson | G06T 19/20 |
| 10,606,151 | B1 * | 3/2020 | Esterholt | H04N 23/51 |
| 11,043,000 | B2 * | 6/2021 | Zhong | G06T 3/00 |
| 2004/0165180 | A1 * | 8/2004 | Voeller | B60C 25/132 |
| | | | | 356/139.09 |

(Continued)

*Primary Examiner* — Jared Walker

(57) ABSTRACT

An autonomous and non-autonomous vehicle tire imaging and inspection system and methods thereof installed onboard a vehicle providing frequent status for inner and outer tire sidewalls, tire tread wear and tread depth, recorded in memory, transmitted to an onboard diagnostics unit, displayed on a dashboard and optionally transmitted to a network. Autonomous and non-autonomous vehicle vehicles may require passing a safety compliance inspection before driving and receive an insurance compliance approval to operate said vehicles.

10 Claims, 10 Drawing Sheets

(56) References Cited

U.S. PATENT DOCUMENTS

| | | | |
|---|---|---|---|
| 2012/0020526 A1* | 1/2012 | Teti | G06T 7/0004 |
| | | | 382/104 |
| 2017/0064161 A1* | 3/2017 | Buss | B60R 11/04 |
| 2018/0031488 A1* | 2/2018 | Waldie | H04N 7/181 |
| 2018/0134217 A1* | 5/2018 | Peterson | G06V 20/58 |
| 2018/0268532 A1* | 9/2018 | Wang | B60C 11/246 |
| 2019/0025580 A1* | 1/2019 | Nagano | G02B 27/01 |
| 2019/0039575 A1* | 2/2019 | Hansen | G02B 27/0006 |
| 2019/0137262 A1* | 5/2019 | Pryce | G01B 11/25 |
| 2019/0377240 A1* | 12/2019 | Lowe | B60R 11/04 |
| 2020/0055516 A1* | 2/2020 | Craddock | H04N 23/698 |
| 2020/0130188 A1* | 4/2020 | Lawrence | G01S 7/4972 |
| 2020/0149997 A1* | 5/2020 | Demirel | G06T 7/55 |
| 2020/0234252 A1* | 7/2020 | Johnson | G06Q 30/0283 |
| 2020/0259919 A1* | 8/2020 | Lepp | H04W 4/44 |
| 2020/0275004 A1* | 8/2020 | Condron | G02B 27/0006 |
| 2020/0280842 A1* | 9/2020 | Liu | H04L 9/3268 |
| 2020/0391558 A1* | 12/2020 | Ghannam | B60C 23/0471 |
| 2021/0197625 A1* | 7/2021 | Laperle | G06T 7/001 |
| 2022/0018935 A1* | 1/2022 | Jefferies | G01B 11/2755 |
| 2022/0332071 A1* | 10/2022 | Roy | B29C 64/20 |

* cited by examiner

APPARATUS AND METHOD FOR ONBOARD STEREOSCOPIC INSPECTION OF VEHICLE TIRES

REFERENCE TO PRIORITY APPLICATION

This application claims the benefit of U.S. provisional application 62/964,230 filed on Jan. 22, 2020 entitled "SYSTEM AND METHOD OF VEHICLE TIRE AND VEHICLE TIRE SIDEWALL IMAGING, INSPECTION AND TIRE STATUS DISPLAY" incorporated herein by reference in entirety and claims the benefit of U.S. provisional application 65/051,380 filed on Jul. 14, 2020 entitled "APPARATUS AND METHOD FOR ONBOARD STEREOSCOPIC INSPECTION OF VEHICLE TIRES" incorporated herein by reference in entirety.

FIELD OF THE DISCLOSURE

The subject matter disclosed herein relates to the field of image processing, vehicle displays, onboard diagnostics, and communications systems.

BACKGROUND OF THE INVENTION

The background relates to systems, and methods of vehicle tire imaging, computerized inspection. vehicle status display, self-driving, autonomous and non-autonomous vehicles and notification thereof.

SUMMARY OF THE INVENTION

A three-dimensional, onboard stereoscopic imaging and inspection apparatus and methods, providing vehicle tire status for inner and outer tire sidewalls, tire tread wear, and tire tread depth, recorded, displayed on a vehicle dashboard and external communications thereof.

An onboard vehicle stereo vision tire inspection and diagnostics provides a substantial safety feature. As will be described infra, the inner tire sidewall warnings, and the diagnostics to identify safety violations provide alerts for tire damage, not always visible from a curbside view. Furthermore, human inspection of vehicle tires is less frequent for self-driving, autonomous vehicles as no driver is readily available for a daily check, or a human daily check is costly. The system can provide daily or real-time monitoring of tire status.

In general, in a first aspect, the invention features an apparatus comprising at least one stereoscopic imaging unit (SIU) configured to couple with a vehicle tire and operative to capture a plurality of three-dimensional tire tread image pairs, a plurality of three-dimensional outer tire sidewall image pairs, and a plurality of three-dimensional inner tire sidewall image pairs, an image processing code operative to process the plurality of three-dimensional tire tread image pairs, the plurality of three-dimensional outer tire sidewall image pairs, and the plurality of three-dimensional inner tire sidewall image pairs for a tire inspection and a detection of tire condition defects, at least one image processor and hardware control unit (IPHWCU) operative to store and run an image processing code to process the plurality of three-dimensional tire tread image pairs, the plurality of three-dimensional outer tire sidewall image pairs and the plurality of three-dimensional inner tire sidewall image pairs for the tire inspection and the detection of tire condition defects, a program instruction code operative to run the IPHWCU and host the image processing code, wherein the program instruction code provides hardware circuit interfaces drivers to communicate with the SIU and other interface circuits, a physical transmission media operative to couple with the at least one SIU on a first distal end and operative to couple with the at least one IPHWCU on a second distal end for a transmission of image pairs and a code configured to execute a service request upon the detection of tire condition defects, wherein the service request triggers a vehicle tire maintenance operation.

The invention provides a method of imaging and inspection of vehicle tire treads and sidewalls comprising the steps of capturing a sidewall as a first three-dimensional image pair and operative to transfer the first three-dimensional image pair to at least one IPHWCU, capturing an inner sidewall as a second three-dimensional image pair and operative to transfer the second three-dimensional image pair to at least one IPHWCU, capturing a tread as a third three-dimensional image pair and operative to transfer the third image three-dimensional image pair to at least one IPHWCU, processing said first three-dimensional image pair, said second three-dimensional image pair and said third three-dimensional image pair in at least one IPHWCU using image processing software for inspecting tires; and detecting tire condition defects in said first three-dimensional image pair, said three-dimensional second image pair and said third three-dimensional image pair, The present invention may embody a system, apparatus, method, computer program product or any combination thereof. The invention may take the form of an entire hardware aspect, an entire software aspect (including firmware, resident software, micro-code, etc) or an aspect combining software and hardware aspects, referred to as a circuit, module, or system. This invention may take the form of a computer program product embodied in any tangible medium of expression, having computer-usable program code embodied in the medium.

BRIEF DESCRIPTION OF THE DRAWINGS

The figures illustrate various objects and features. Some objects or features may be exaggerated to show details of components where the drawings are not to scale. Any measurements or specifications shown in the figures are illustrative and are not restrictive. Figures may show corresponding elements by repeating reference numbers and numerals. Identical or similar elements may show the same or similar reference numerals as various aspects and features when useful to combine. The accompanying drawings describe various examples concerning the invention.

DETAILED DESCRIPTION

Figure 1:
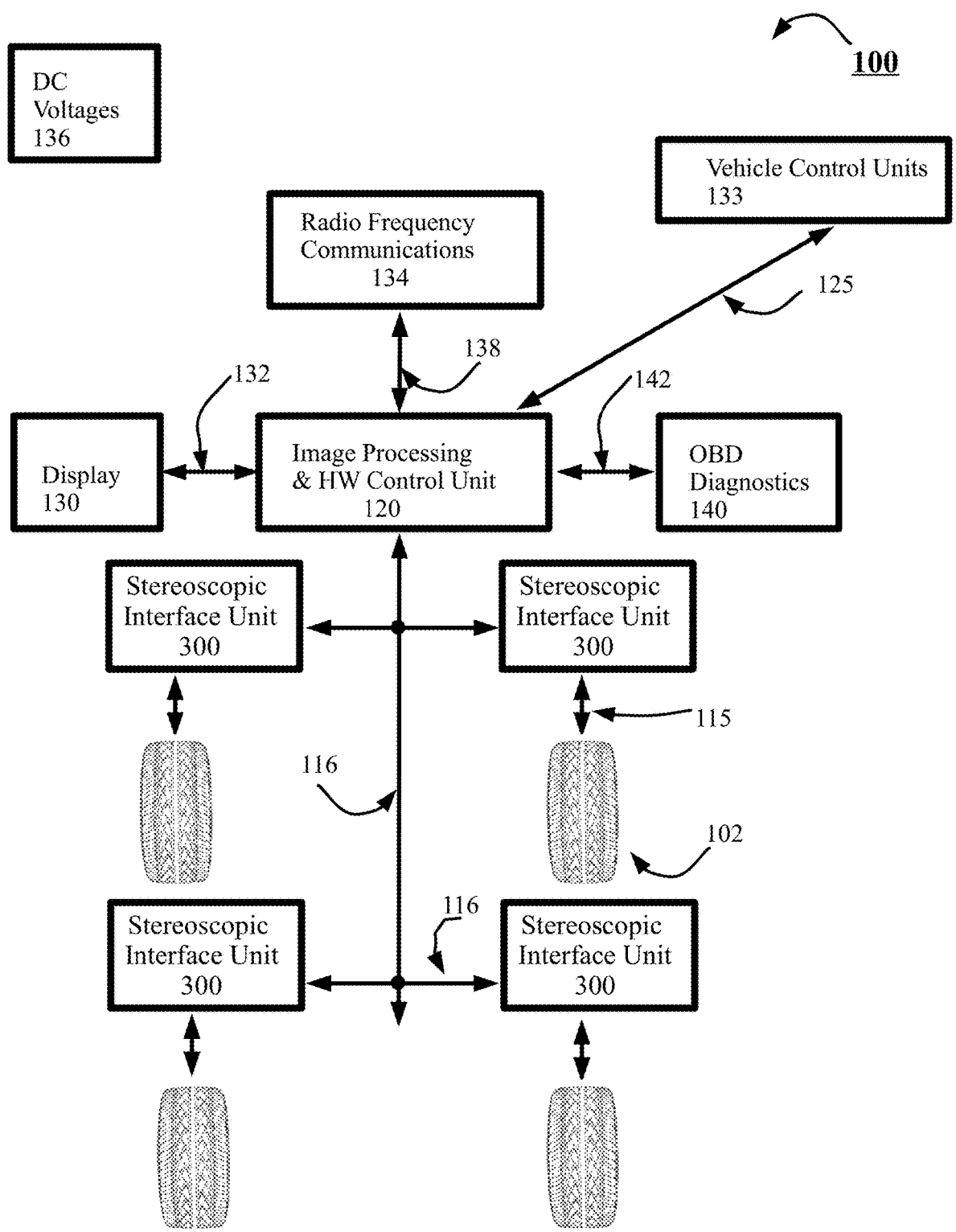
FIG. 1 is a high-level block diagram illustrating a four-tire vehicle.

Referring now to FIG. 1, a high-level block diagram illustrates a four-tire vehicle. System 100 represents a wheeled vehicle comprising four tires. The example shows four tires, but the system can support a vehicle of any plurality of tires. Each tire 102 has at least one SIU 300 to capture at least one three-dimensional tire image pair per tire side wall and at least one three-dimensional tire image pair per tire tread. SIU 300 couples 115 to the tire 102 by a field of view (FOV) parameter determined by the required optics. The tire's outer sidewall 104, corresponding to the example of two tires mounted on one axle, faces towards the curb/sidewalk on a first side of the vehicle and faces towards the street on the second corresponding second side of the vehicle. The corresponding tire's inner sidewalls face each other and mount on distal axle ends. An axle with four tires comprises, two outer tire sidewalls and six inner tire sidewalls. Each axle has a maximum of two out tire sidewalls and is true for an axle with six, eight, ten or more tires.

System 100 further comprises at least one image IPHWCU 120 providing image processing resources and memory required to analyze the captured image pairs. IPHWCU receives image pairs for processing, inspects the image pairs for tire damage, wear, and analysis of defects. System 100 further comprises a display 130, an optional onboard diagnostics (OBD) 140, direct current voltages 136, optional radio frequency (RF) communications 134. A plurality of communications buses couples the IPHWCU to an SIU-bus 116, a vehicle control unit bus 125, a display-bus 132, an RF-bus 138, and an OBD-bus 142.

The SIU-bus 116, vehicle control unit bus 125, display-bus 132, RF-bus 138, and OBD-bus 142 consist of a physical transmission media and each are selected from at least one member of a physical transmission media group comprising a single wire, a parallel bus, at least one twisted-pair, fiber-optic, IEEE 1394 or MIL-STD-1773. The physical transmission media are operative to couple with at least one SIU 300 on a first distal end and operative to couple with the at least one IPHWCU on a second distal end and operative to couple using a display-bus 132 with a display 130 on a third distal end and communicative to couple with an radio frequency (RF) communications 134 on a fifth distal end.

A vehicle bus protocol is operative and communicatively coupled with each physical transmission media a SIU-bus 116, a vehicle control unit 125, a display-bus 132, an RF-bus 138, and an OBD-bus 142. The vehicle bus protocol is communicative to couple with the at least one SIU 300 on a first distal end and communicative to couple with the at least one IPHWCU 120 on a second distal end, communicative to couple with a display 130 on a third distal end, communicative to couple with an OBD 140 on a fourth distal end and communicative to couple with an radio frequency (RF) communications 134 on a fifth distal end. There may be one or more vehicle bus protocols operative on the vehicle.

A vehicle bus protocol refers to at least one member of a vehicle bus protocol group comprising the following protocols: A²B, AFDX, ARINC 429, Bluetooth, Byteflight, Controller Area Network (CAN), Cortex AHB. Cortex APB, Cortex AHX, D2B, FlexRay, BUS [2], IDB-1394, IEBus, Inter-Integrated Circuit (I²C), ISO 9141-1/-2, J1708 and J1587, J1850, J1939, ISO 11783, J1939, ISO 11783, Keyword Protocol 2000, Local Interconnect Network (LIN), MOST, Multi-Function Vehicle Bus, simple parallel bus protocol, Train Communication Network IEC 61375, Serial Peripheral Interface (SPI), SMARTWIREX, VAN, HDBaseT automotive protocols, power-line communication, and Universal Serial Bus (USB).

In one aspect, the system is operative to communicate according to the Intelligent Transportation Systems (ITS). In one aspect, vehicles, and roadside units operate using dedicated short-range communications (DSRC) devices operative in the 5.9 GHz band with a 75 MHz bandwidth.

A power supply circuit outputs one or more direct-current voltages (DC) 136 to system electronics meeting all operating voltage levels system requirements. The input to the power supply circuit is operative to couple with the vehicle battery, often a standard 12 volts automobile battery or 24 volts truck battery. The power supply circuit comprises direct-current battery voltage to direct-current switching step-up circuitry and/or step-down circuitry from a vehicle battery. Other power supply circuits may comprise linear voltage regulators, Schottky diodes, and resistive voltage dividers.

A vehicle display 130 is communicative to couple via a display-bus 132 with the at least one IPHWCU 120. In one aspect, display 130 comprises a one or more vehicle dashboard displays, or other visual indicators. A visual indicator is selected from a group comprising a (1) Light-Emitting Diode (LED); (2) incandescent lamp; (3) fluorescent lamp; (4) active matrix organic light-emitting diode (AMOLED); (5) In Plane Switching displays; (6) LCD screen; or similar. The visual indicator may be steady, blinking, and can further be used to illuminate a part of the dashboard.

The vehicle display(s) 130, displays warnings for tire condition abnormalities, tire damage, or tire wear. Displaying inner sidewall warnings is a method to alert vehicle operators for tire problems not always visible from a curbside view and is a substantial safety feature. These tread and sidewall warnings comprise a group of the following tire condition defects: (1) sidewall bulge from broken cords inside a tire; (2) wheel misalignment; (3) tire zipper failure; (4) bulging; (5) center tire wear; (6) shoulder tire wear; (7) feathering; (8) flat spot wear; (9) cupped wear; (10) chunks of missing rubber; (11) deep abrasions from hitting curbs; (12) various cuts in the rubber; (13) cracks in the rubber; (14) sharp object puncturing the tire, (15) one-side wear; and (16) other tire failures. The object puncturing the tire may be a nail, screw, sharp metal, glass, sharp plastic, or other material capable of damaging the tire. The term "rubber" refers to natural rubber, synthetic rubber, or mixtures and additives thereof.

In one aspect, the vehicle display 130, can suggest a specific service. Flat spot wear detection may trigger a "Check Brakes" warning and a "Replace Tire" warning. Cupped wear detection may trigger the vehicle display 130 to check for a worn shock absorber or check for a faulty suspension system. Detection of one-side wear triggers a vehicle display warning for a vehicle alignment, springs, and ball joints check.

One or more vehicle display 130, provide vehicle owners and/or fleet operators both information and confidence to request a specific vehicle service. The warnings provide feedback for proper vehicle maintenance, improving safety by repairing or replacing tires when required. The service request triggers a service request for a tire maintenance, wherein the tire maintenance comprises: (1) repair; (2) replacement; (3) rotation and (3) inflation. It also boosts vehicle owners and/or fleet operator confidence in reducing the fear of performing unnecessary repairs, as shown later in the disclosure. In one implementation, the vehicle display 130, can provide warnings to owners and operators of eighteen-wheeler vehicles, also known as a semi-tractor-trailer truck. The multi-tire mounting on semi-tractor-trailers impedes the view of inner sidewalls for inspection. Defects and damages may also occur during operation of the vehicle. These can occur when driving over objects protruding above the road, or below the road, (e.g., hitting potholes), or driving off-road. Damage to the tires may occur without the knowledge to the vehicle operator and the invention's automatic inspection may prevent serious accidents when early detection of tire wear or damage occurs. Future safety statistics may show the present invention reduces vehicle accidents.

In one aspect, the radio frequency (RF) communications 134 transmits tire status to a vehicle inspection station during periodic, semi-annual, or annual checks. These checks may comprise the emissions and safety testing required by federal, state, or other governmental authorities. In one implementation, is the transmission of tire status information using radio or cellular circuitry of Wi-Fi, 3G, 4G or 5G technologies, wideband code division multiple access (WCDMA), and/or worldwide interoperability for microwave access. Bluetooth. In one aspect, transmitting tire status information uses a universal serial bus USB. Further advantages for self-driving, autonomous vehicles occur where human inspection of vehicle tires is less frequent as no driver is available for a daily check. An automatic tire inspections system for autonomous vehicles is cost effective compared to the labor costs of checking the tires daily. Self-driving, autonomous vehicles send tire status information and warning messages to owner and/or fleet maintenance via the radio frequency communications.

In one aspect, transmitting tire status information to a network as a component of a vehicle fleet management procedure, where autonomous vehicles must pass a safety compliance inspection before driving and/or receive an insurance compliance approval to proceed. In some cases, non-autonomous vehicles must pass a safety compliance inspection before driving and/or receive an insurance compliance approval to proceed. In one implementation, leasing fleets must pass a safety compliance inspection before driving and/or receive an insurance compliance approval to proceed. In one implementation, a specified time of several days, a week or two weeks may be given to complete a repair or service. In one implementation, only subsets of defects can cause insurance revocation or suspension. In some cases, a tow truck may be called and driving not permitted. According to some aspects, a privately owned and managed fleet of vehicles must pass a safety compliance inspection before driving and/or receive an insurance compliance approval to proceed. In some cases, this fleet may be owned by a federal agency, a U.S. State, county, or local governments. In some cases, the fleet may be owned by a corporate entity.

Figure 8:
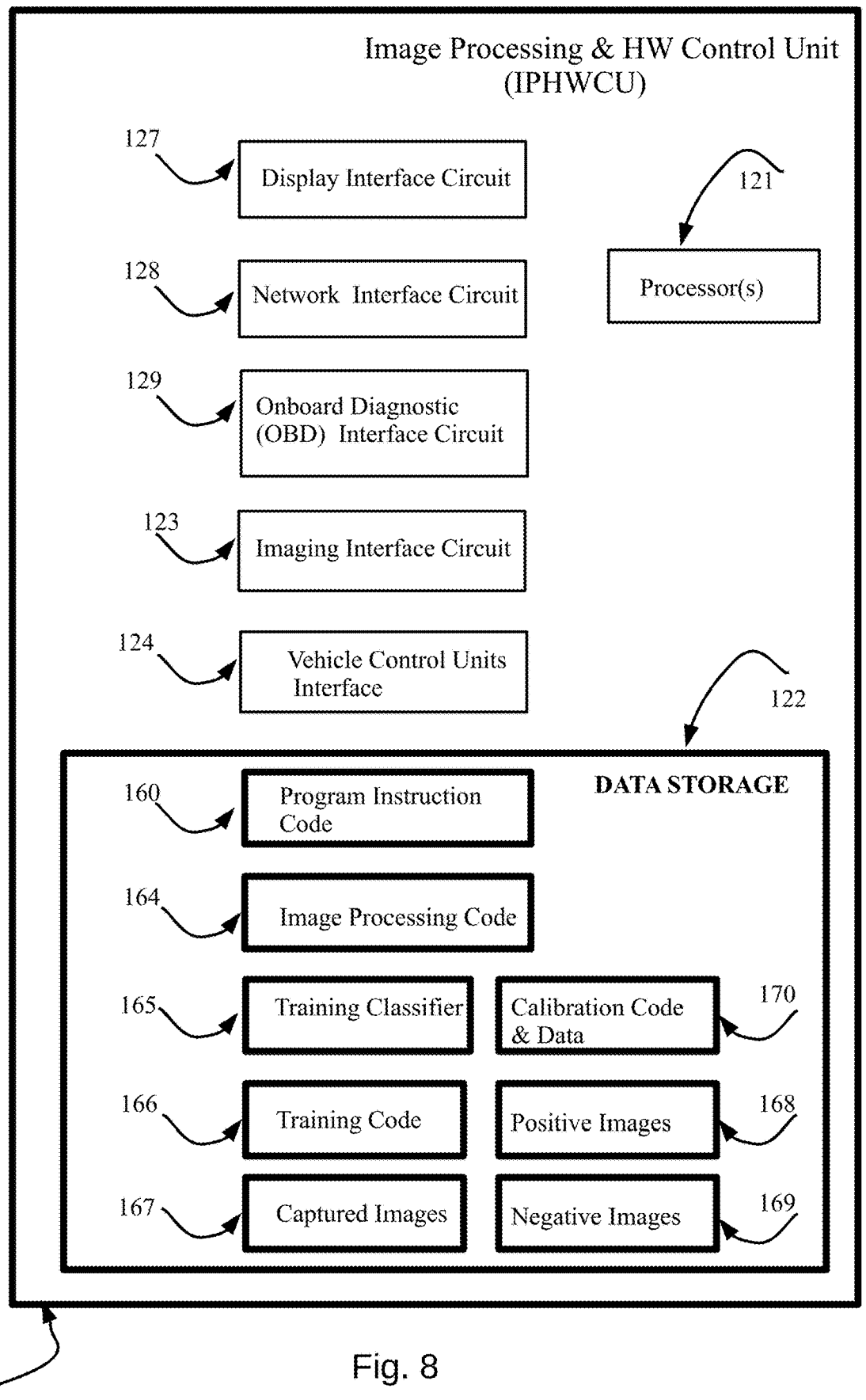
FIG. 8 is a high-level block diagram illustrating example image processing and hardware control unit components thereof.

Referring to FIG. 8, a high-level block diagram illustrates example image processing and hardware control unit components thereof. The computer-readable program instruction code may execute entirely or partly on an IPHWCU 120. In one aspect, processors 121 execute the computer-readable program instruction code by using state information of the computer-readable program instruction code to personalize the electronic circuitry, to perform aspects of the present invention. The IPHWCU 120 architecture may be homogenous or heterogeneous for parallel processing, as clusters, and/or as one or more multi-core processor(s). The data storage 122 may include one or more non-transitory persistent storage devices, for example, a hard drive disk (HDD), a Solid-State Disk (SSD), a flash array for the storage of program instruction code 160, image processing code 164, training classifier 165, training code 166, captured image pairs 167, positive images 168, negative images 169, calibration code and data 170, and other data deemed required. Data storage 122 may further include one or more networked storage resources accessible over the network(s) through the network interface circuit 128 to a network attached storage (NAS), a storage server, cloud storage, and/or the like. Duse one or more volatile memory devices for temporary storage of program instruction code 160, image processing code 164, training classifier 165, training classifiers 166 and/or data. An IPHWCU may execute one or more software modules, for example, a process, a script, an application, an agent, a utility. Software module execution comprises a plurality of program instruction code, stored in a non-transitory medium. In one aspect, the IPHWCU 120 may include and/or integrate radio frequency (RF) communications 134.

The program instruction code 160 may include a software operating system running Unix, Linux, Android, Windows, and/or other embedded operating systems. Also, the invention is operational in systems incorporating video and still cameras, sensors, etc. such as found in automated factories, autonomous vehicles, in mobile devices such as tablets and smart-phones, smart meters installed in the power grid and control systems for robot networks. The image processing code 164, training classifier 165, training code 166, positive images 168, and negative images 169 is operational on these operating systems.

Code is a plurality of computer-executable instructions grouped into program modules executed by the computer. Program modules comprise routines, programs, objects, components, data structures to perform specific tasks or implement specific abstract data types. In one aspect, distribution of the code on computing environments performs tasks by remote processing devices linked through a communications network. In a distributed computing environment, program modules may be in both local and remote computer storage media, including memory storage devices.

Data storage 122 is any combination of one or more computer-usable or computer-readable medium(s) is possible. The computer-usable or computer-readable medium may be, for example, but not limited to, an electronic, magnetic, optical, electromagnetic, infrared, or semiconductor system, apparatus, device, or propagation medium. More specific examples comprising a computer-readable medium includes: an electrical connection having one or more wires, a portable computer diskette, a hard disk, a random access memory (RAM), a static random access memory (SRAM), a dynamic random access memory, Synchronous dynamic random access memory (SDRAM), Double-Data-Rate SDRAM (DDR SDRAM), a read-only memory (ROM), an erasable programmable read-only memory (EPROM or flash memory), an USB memory device, a portable compact disk, a read-only memory (CD-ROM), an optical storage device. A computer-usable or computer-readable medium may be any medium that can contain or store the program for use by or with the instruction execution system, apparatus, or device. A computer-readable medium is not in the category of transitory signals, such as radio waves or other propagating electromagnetic waves, electromagnetic waves propagating through a waveguide, Computing/processing devices loads, or mounts computer-readable program instruction code 160 from a computer-readable storage medium using data storage 122. In one aspect, an external computer, or external storage device via a network, for example, the Internet, a local area network, a wide area network and/or a wireless network loads, loads, or mounts computer-readable program instruction code 160 from a computer-readable storage medium. The network may comprise copper transmission cables, optical transmission fibers, wireless transmission, routers, firewalls, switches, gateway computers and/or edge servers. A network adapter card or network interface in each computing/processing device receives computer-readable program instruction code from the network and forwards the computer-readable program instructions for storage in a computer-readable storage medium within the respective computing/processing device.

Computer program instruction code for carrying out operations of the present invention may be in any combination of one or more programming languages, including object-oriented programming language such as Java, C++, C# or the like, conventional procedural programming languages, such as the "C" programming language, and functional programming languages such as Prolog, Perl, and Python, machine code, assembler, image processing languages or scripts such as openCV, machine learning languages or programs such as Python, R, Matlab, Go, *Julia*, machine learning tools such as TensorFlow, PyTorch, Sci-kit Learn, Keras, or any other suitable programming languages.

The program instruction code may execute entirely on the user's computer, as a stand-alone software package, partly on the user's computer and partly on a remote computer or entirely on the remote computer or server. In the latter scenario, the remote computer may connect to the user's computer through radio frequency (RF) communications 134 and to the IPHWCU via the network interface circuit 128 using any network protocol, including for example a local area network (LAN) or a wide area network (WAN), WLAN, WCDMA, WiMAX or may connect to an external computer for example, through the Internet using an Internet Service Provider.

The computing device, referred to as a processor(s) 121, is operational with general-purpose, special-purpose and image processing computing system environments or configurations. Examples of well-known computing systems, environments, and/or configurations that may be suitable for use with the invention include comprises personal computers, server computers, cloud computing, hand-held or laptop devices, multiprocessor systems, microprocessor, microcontroller or microcomputer-based systems, application-specific integrated circuit (ASIC) or field-programmable gate array (FPGA) cores, digital signal processing (DSP) cores, Cortex-A8 processing core(s), Brisbane processing core(s), neural network (NN) processors, convolutional neural network processors, (CNN), graphics and image processing integrated circuits and boards, single-board computer (SBC), graphics processing unit (GPU), Nvidia graphics board, Habana Labs (Intel now), Goya Inference Processor, Qualcomm processors, Rockchip RK1808 neural network processing units, Hailo neural network processors, Habana Labs neural network processors, Intel neural network processors, Samballova configurable processors, PCIe cards, VME boards, Raspberry Pi boards, Arduino boards, Beagle boards, network PCs, minicomputers, mainframe computers, distributed computing environments that include any of the above systems or devices, and similar others.

In one aspect, the IPHWCU 120 is communicative to couple via an onboard diagnostic interface circuit 129 with a vehicle OBD 140. The OBD is operative to receive vehicle tire inspection results. In one aspect, non-volatile memory in the OBD stores tire inspection results. According to one aspect of the invention, the OBD 140 configuration receives data from one or more IPHWCU 120 for generation of one or more diagnostic codes associated with one or more vehicle tire inspections. For example, the OBD 140 may comprise a diagnostic system compliant with one or more vehicle diagnostic standards, such as OBD-II. In such cases, the OBD 140 may provide a plurality of diagnostic codes. The OBD may provide one or more manufacturer specific diagnostic codes comprising a standardized format. The OBD-II standard defines example standardized diagnostic codes where manufacturer specific diagnostic codes comprise a specified format, such as <X><N1><N2><N3><N4>.

In one aspect, non-volatile memory in the IPHWCU using data storage 122 saves tire inspection results. In one aspect, tire inspection results couple to a display 130 via a display interface circuit 127. According to one aspect of the invention, the IPHWCU 120 is operative to trigger other indicators (e.g., dashboard lights) to warn a vehicle operator of potentially dangerous or problematic conditions derived from tire inspection results. According to another aspect of the invention, IPHWCU 120 may comprise and/or integrate an OBD 140. In one aspect, the IPHWCU 120 is communicative to couple with other vehicle control units 133 via a OBD 140 interface and physical medium 125. The vehicle control units 133 may comprise steering control units, generic vehicle computer units, transmission control units and any vehicle electronics required to communicate with the IPHWCU 120. Vehicle control units may act as a master controller for the vehicle where the IPHWCU 120 acts as a peripheral device.

The IPHWCU 120 is operable to couple with each SIU 300 via the SIU-bus 116. In one aspect, the IPHWCU interface to the SIU-bus 116 comprises a HDBaseT signaling. The HDBaseT may comprise a Valens automotive integrated circuit operative to communicate with SIU 300 electronics via a PCIe interface on a second distal end. The Valens circuitry supports gigabit Ethernet over a twisted pair cable on a first distal end and interfaces to electronic circuitry on the second a distal end via a PCIe interface bus. Present Valens semiconductor offerings comprise the following part numbers: VA6000, VA608A, and VA6080.

In a best mode, the IPHWCU does not use real-time streaming. The amount of processor resources and processor cycles required for non-real-time streaming is negligible compared to the time between inspecting the tires. In one aspect, a non-real-time image processor couples to each SIU where there is no image processing time requirement for real-time streaming. Leveraging a minimum amount of processing power to analyze a few captured stereo image pairs for the longest time-period possible maximizes high volume production efficiency and lowers manufacturing cost savings. The phrase "time period" in this paragraph defines the time between inspecting tires and may occur on average once per day, or several times per day. Tire inspections can occur each time the vehicle starts with other vehicle execute built-in self-tests. An additional advantage of integrating the SIU with the image processor is one module can support generic vehicle types using a programmable vehicle bus protocol. In some cases, the physical transmission media mounts on a second printed circuit board, which may swap and functions as an adapter to match vehicle cabling.

Figure 2:
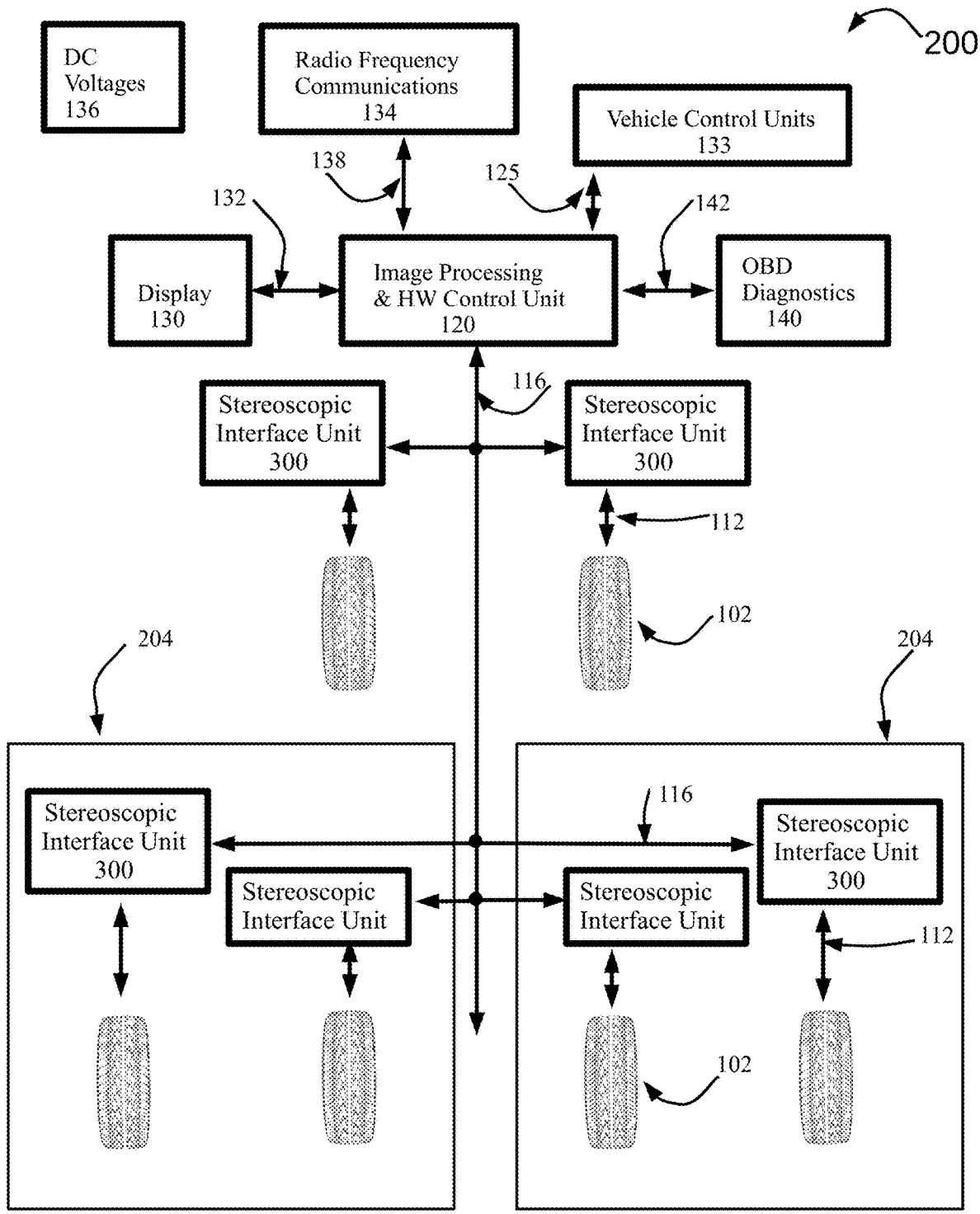
FIG. 2 is a high-level block diagram illustrating a six-tire vehicle.

Referring to FIG. 2, a high-level block diagram illustrates a six-tire vehicle. System 200 and System 100 share many blocks in common. System 200 further comprises dual tire block 204, illustrating pairs of tires 102 mounted on distal axle ends. There figure does not show an axle connecting the tires, and its inclusion is self-understood. Each dual tire block 204 further illustrates a pair of tires and the corresponding six inner side walls facing each other. System 200 may comprise either an even or odd number of tires on each distal axle end. 204 may comprise at least two or more tires. Therefore, it is possible to have a system with six tires on each axle, thus having an odd number of tires on each distal axle end. It is also possible to have eight or more tires on each axle where the corresponding number of SIUs will increase.

In one aspect, 204 comprises a single SIU mounted on a mechanical mounting system operationally and visually coupled to a plurality of tires. The optics and mounting hardware 350 will guide one SIU per 204 to support any plurality of tires, guiding the vision system using mechanical movements 370 to capture image pairs of all the tire sidewalls and treads.

The electronic components comprising all the systems have an operational temperature range selected from a group specified as: (1) industrial: −40° C. to 85° C.; (2) automotive: −40° C. to 125° C.; (3) extended industrial: −40° C. to 85° C.; or (4) military: −55° C. to 125° C. In one aspect, a system is IP67 compliant for outdoor operation and water resistance. In another aspect, a system is IP68 compliant system for outdoor operation and water resistance.

Figure 3:
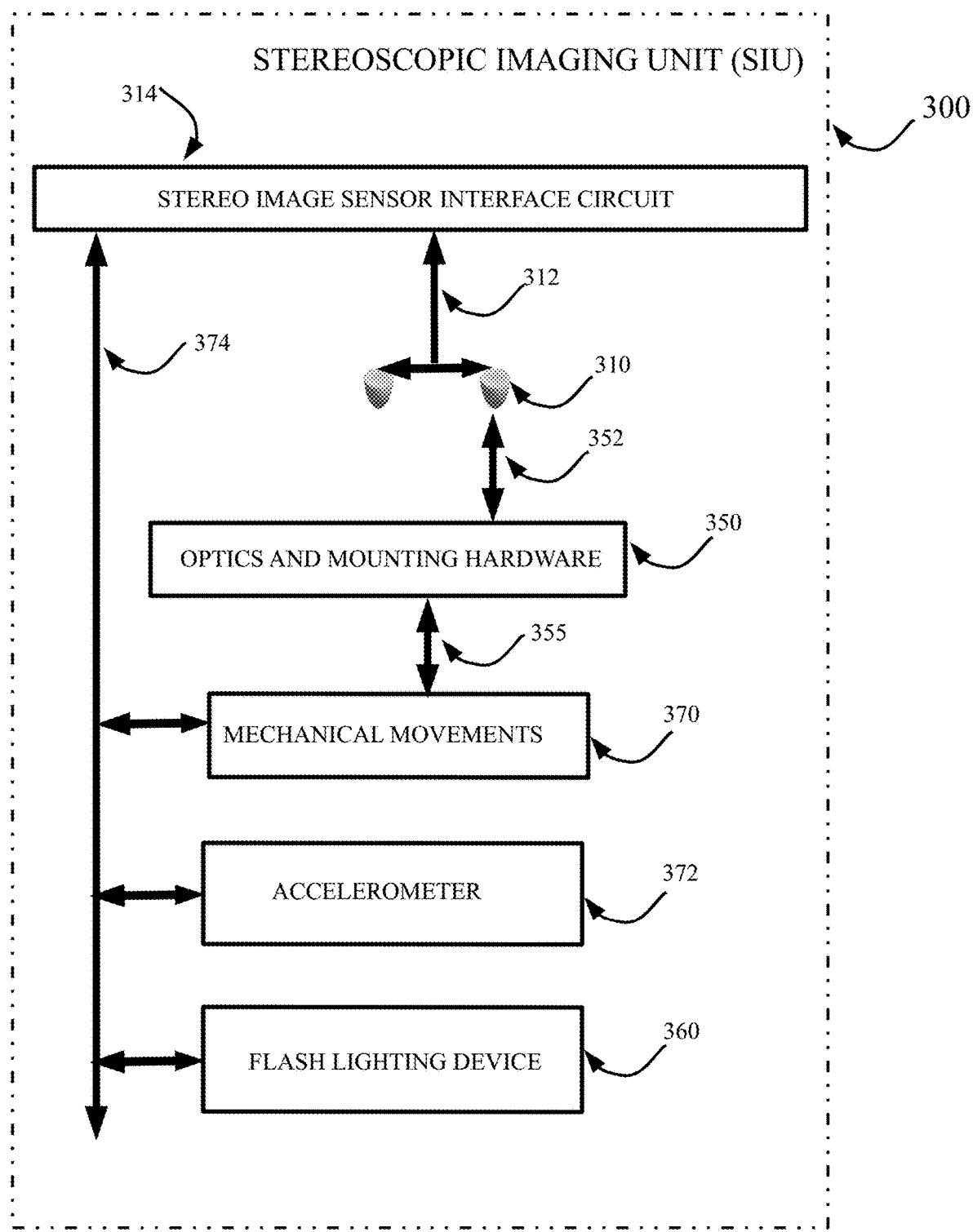
FIG. 3 is a high-level block diagram illustrating stereoscopic imaging unit components thereof.

Referring now to FIG. 3, a high-level block diagram illustrates a stereoscopic imaging unit. SIU 300 comprises at least two image sensors or cameras 310 and associated optics and mechanical mounting hardware 350, a stereo image sensor interface bus 312 and a stereo image sensor interface circuit 314 (a.k.a. camera interface circuit) operative to couple with at least one IPHWCU 120 via a SIU-bus 116. Lighting device 360, mechanical movements 370, and accelerometer 372 couple to the stereo image sensor interface circuit 314 via 300-bus 374. FIG. 3 also includes optional mechanical movements 370, operative to aim the stereo image sensor. In one aspect, optional mechanical movements 370 that couples to an optional accelerometer 372.

The SIU 300 is a stereo camera unit comprising image sensors and stereo vision interface circuitry. In one aspect, the stereo image interface circuit interface circuitry 314 may comprise an intellectual property (IP) core for an FPGA. After testing and system verification, an FPGA to ASIC conversion provides an alternative for a mass production and lower costs. In another aspect of the invention, SIU 300 uses a design kit such as the Raspberry Pi and Arducam project depth mapping on Arducam stereo camera HAT with OpenCV using the OV5647 stereo camera board. Present Nerian Vision Technologies stereo vision modules with real-time streaming are too expensive. According to another aspect of the invention, SIU 300 uses the FPGA technology of Karmin 3D Stereo Camera. Another aspect modifies the Dan Strother verilog based FPGA stereo core project, freely available under a 3-clause BSD license. A drawback of off-the-shelf (OTS) stereo camera products is the high cost of real-time streaming. A low-cost solution is desirable and attainable by removing the real-time streaming support. Removal of real-time streaming may lower the overall hardware silicon area, thereby reducing the total hardware costs.

In one implementation, the SIU creates a stereo image by capturing an image pair from the two image sensor/cameras. The image pair consists of a right sided image, and a left sided image. A right sided image, and a left sided image combine in the SIU to create a stereo image, also known as stereo vision. SIU transfers the stereo image to the IPHWCU for image processing, defect recognition, and character recognition. The phrase "stereo image" also refers to a three-dimensional image pair.

In one implementation, the SIU captures two images from the two image sensor/cameras. These two images are a right sided image, and a left sided image. In another aspect, the SIU transfers the right sided image, and the left sided image to the IPHWCU, where the IPHWCU combines the right sided image and the left sided image into a stereo image. A right sided image and a left sided image are also referred to as a three-dimensional image pair. The phrase "three-dimensional image pair" can refer to both before and after stereo combining.

SIU is operative according to the following steps of first capturing an outer sidewall as a first three-dimensional image pair and operative to transfer the first three-dimensional image pair to at least one IPHWCU. Then a next step is capturing an inner sidewall as a second three-dimensional image pair and operative to transfer the second three-dimensional image pair to at least one IPHWCU. A next step is capturing a tread as a third three-dimensional image pair and operative to transfer the third image three-dimensional image pair to at least one IPHWCU. Then processing the first three-dimensional image pair, the second three-dimensional image pair and the third three-dimensional image pair in at least one IPHWCU using image processing software for inspecting tires. In one aspect, the SIU transfers the right sided image and left sided image to the IPHWCU for processing and creation of a stereo image. Last, detecting tire condition defects in said first three-dimensional image pair, said three-dimensional second image pair and said third three-dimensional image pair.

The at least two image sensors 310 comprise CMOS or sCMOS image sensors. Technological advances do not preclude using other image sensors. The stereo image sensor bus 312 may comprise: (1) a parallel signal bus; (2) MIPI alliance camera serial interfaces (CSI); (3) MIPI CSI-2; (4) PCIe; or (5) other differential signal bus. The stereo image sensor interface circuit 314 comprises electronic circuitry operative and communicative to couple with image sensor components between various system blocks. The stereo image sensor interface circuit, 314, may include a microcontroller, field programmable gate array (FPGA) or other similar embedded devices for interfacing electronics. Some of many examples of CMOS sensors are ON Semiconductor AS01xx, AR14xxx, ARO23SRxx. Other examples are available from ST Miroelectronics which offers many CMOS image sensors.

An optic and mounting hardware 350 can connect 352 to the image sensor 310 for focus and image capture enhancements. The optics comprises lens and mounting hardware for three-dimensional image capture. According to some cases, the mounting hardware 350 may connect 355 to mechanical movements 370, allowing the positioning and aiming of the image sensors. The mounting hardware can have mechanical movements, 370, comprising an epicyclic train allowing for adjusting the angular image capture of the treads and/or sidewalls. In one aspect, the mechanical movements 370 is a rectilinear slide motion whereby a screw guides the image sensor 310 to a more favorable FOV position. In one aspect, the mechanical movements 370 uses a wheel to produce rotary motion got from circular motion of a screw for guiding the image sensors. In another aspect, a stepper motor may control, or a direct-current motor enables the mechanical movements 370. The IPHWCU and/or an embedded application using a micro-controller in the SIU provides control and signaling commands over bus 374 to the movement motors via the stereo image sensor interface circuit 314. In one aspect, the mechanical movements 370 includes an optics lens cover to protect the optics of 350 from dirt, grease, grime, and filth. The movable mechanism closes to cover the lens by default and opens to expose the optics during image capture. The lens covers should open for only the time required to capture image pairs.

In one aspect, the SIU 300 includes a plurality of two or more image sensors. The SIU may include two, three, four, five, six or more image sensors. In one aspect, the SIU uses three image sensors, where a left sensor and middle sensor capture one sidewall, a right sensor, and center sensor captures a second sidewall and the left sensor and right sensor capture the tire tread. In one aspect, the SIU 300 comprises two image sensors for the inner sidewall, two image sensors for the outer sidewall and two image sensors for the top of the tire tread 550. In one aspect, 204 illustrates a configuration of SIUs for dual/double tires mounted on each distal end of an axle supporting semi-tractor type trailer vehicles, various trucks, and other vehicle axles comprising four or more tires. In another alternative, mounting may comprise at least three or more tires on each distal end of an axle, each tire with a corresponding SIU. Monitoring the status of tire sidewalls between adjacent tires is advantageous as inner tire sidewalls are not easily visible to the vehicle operator. These are the tire sidewalls facing each under the vehicle and not the sidewalls facing away from the vehicle toward a sidewalk or another lane of the road. As autonomous self-driving vehicles become more widespread in the market, automatic tire inspection, absent human drivers may become an insurance and/or regulatory safety requirement.

SIU 300 may include a lighting device 360 for illuminating the tires during image capture and is operative to couple with the at least one SIU 300. Camera lighting devices may be a flash Bulb, a Led flash, or an infrared light with focal-plane-shutter synchronization, flash intensity, and flash duration as required. The lighting may be steady or blinking. Stereo image interface circuit 314 provides signals to control the lighting device.

In one aspect, the SIU 300 may include an accelerometer 372 to measure sudden G-force when hitting a deep pothole, curb, or other object capable of damaging tires. The accelerometer outputs a signal via bus 374 to the stereo image interface circuit 314 whereupon a reading of a substantial "G" force above a substantial threshold triggers the SIU 300 to start a tire inspection checking for tire damage. The inspection will create a call to begin a capture image event, wherein the configuration captures a plurality of three-dimensional tire tread image pairs, a plurality of three-dimensional outer tire sidewall image pairs and a plurality of three-dimensional inner tire sidewall image pairs to inspect the tires for damage from the substantial G-force and observed defects. In one aspect, accelerometer connects to each shock absorber. In one aspect, the accelerometer connects to each tire. In one aspect, each accelerometer connects to a vehicle chassis point receptive to receive the greatest force of shock, G-force applied against each tire. For a four-tire vehicle, there would be four accelerometers. For each vehicle type, there is one accelerometer for each tire.

Figure 4:
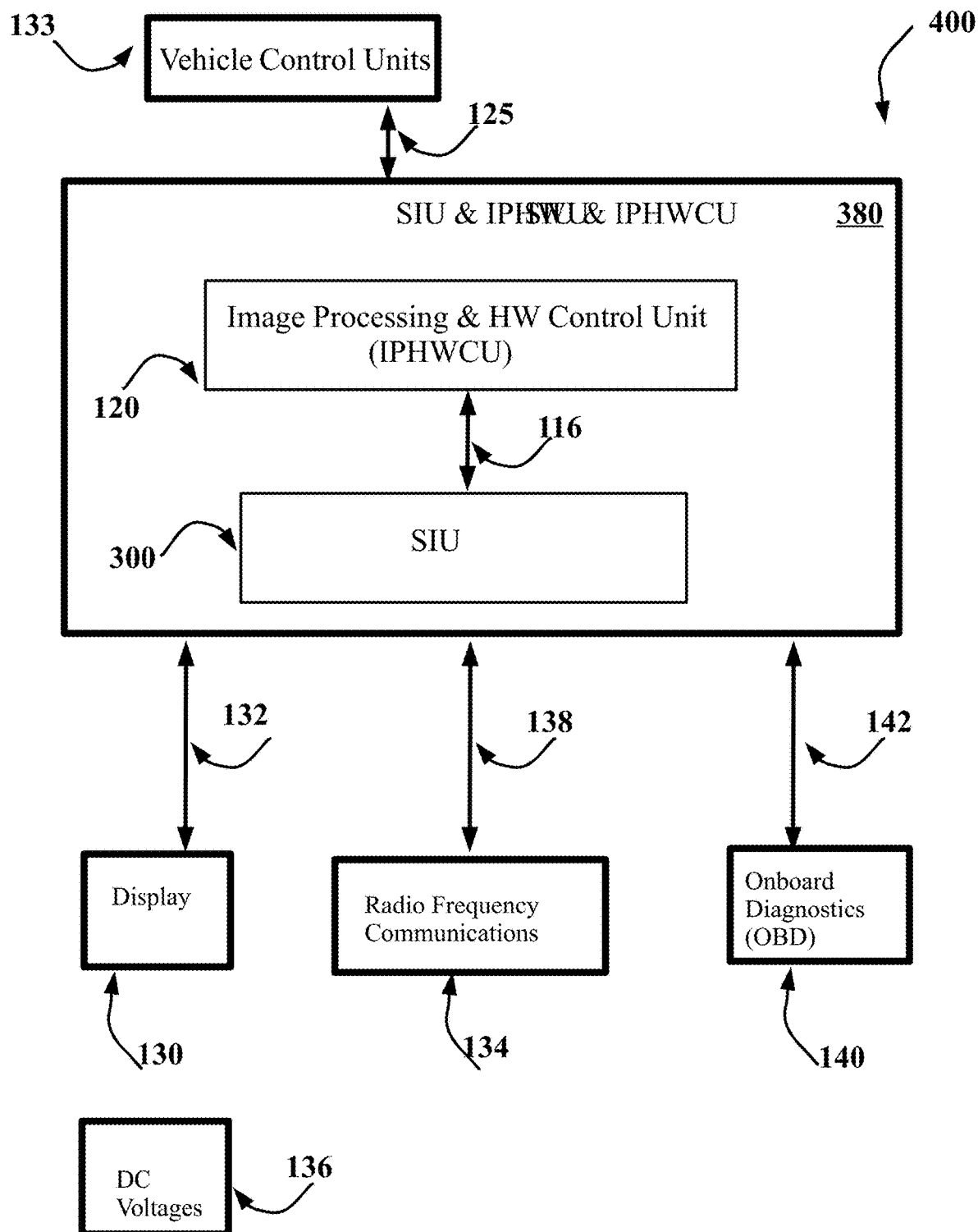
FIG. 4 is a high-level block diagram illustrating example integration of stereoscopic imaging unit and image processing and hardware control unit.

FIG. 4 shows a high-level block diagram illustrating example integration of a stereoscopic imaging unit and image processing and hardware control unit (SIU & IPHWCU). In one aspect, SIU 300 couples via SIU-bus 116 to the IPHWCU 120 and integrate to become the SIU & IPHWCU 380 to provide a self-contained unit supporting each vehicle tire. SIU & IPHWCU 380 interfaces to system device bus either in a point-to-point configuration or a daisy chain configuration. In a daisy chain configuration, SIU & IPHWCU, 380, are daisy chained one to another and only the last, or first SIU & IPHWCU 380 connects to the display, OBD, and RF communications unit. Display 130 couples to the SIU & IPHWCU via the display bus 132. Radio frequency communications unit couples to the SIU & IPHWCU via the RF-bus 138 and couples to the OBD-bus 142. Direct current voltages 136 supplies voltages to all electronics throughout the system.

The SIU 300 may conform to an IP67 outdoors environmental specification which offers protection against dust, water damage, and dirt. In another case, the SIU 300 may conform to the IP68 outdoors specification against dust, dirt, and water damage to protect the optics. These specifications protect the electronics and optics against environmental damage.

Figure 5:
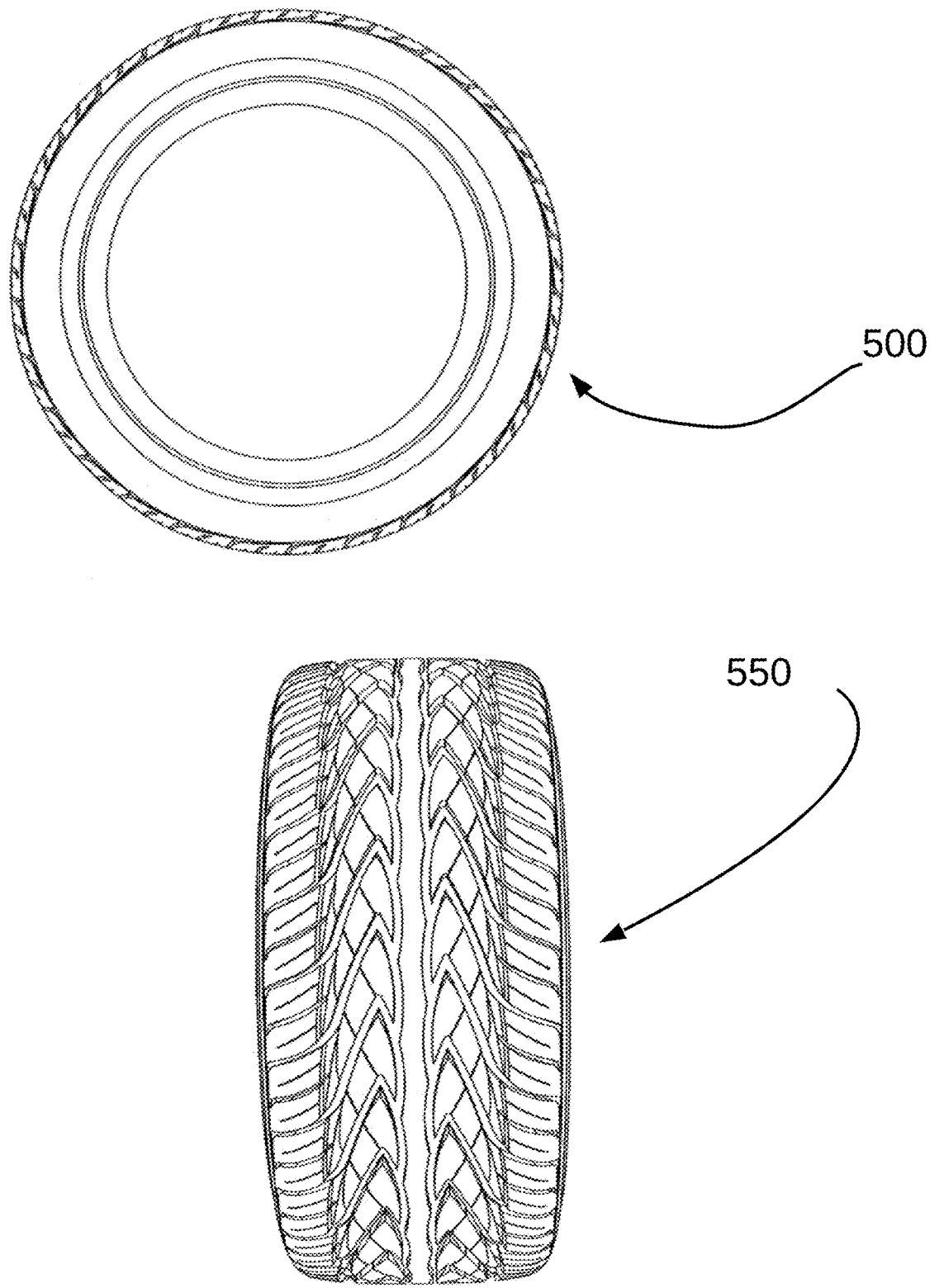
FIG. 5 is a diagram illustrating a tire sidewall and a top tire tread.

FIG. 5 is a diagram illustrating a tire sidewall 500 view and a tire tread 550 front view. The SIU inspects the tire tread 550 using three-dimensional image processing techniques, and the system is communicative to couple with the vehicle display 130, and/or OBD.

In one example application, a tire tread depth is measured using 3D imaging techniques as a percentage where: (1) eight millimeter mm depth represents a new tire; (2) seven mm depth shows approximately, substantially a 15% worn tire; (3) six mm depth shows approximately a 30% worn tire; (4) five mm depth shows approximately, substantially a 50% worn tire; (5) four mm depth shows approximately, substantially a 60% worn tire; (6) three mm depth shows about approximately, substantially an 80% worn tire; (7) two mm depth shows approximately, substantially a 95% worn tire; (8) and 1.6 mm depth shows a 100% worn tire.

In one example, non-volatile memory stores three temporary files, file1, file2, and file3 store treadwear values, inner sidewall, and outer sidewall wear analysis. A service log stores data with a time and date stamp for safety compliance documentation and insurance claims defense in the event of a car accident and/or negligence allegations. This implementation disclosing three files to store information is not limiting and is one application example.

In one aspect, the system conforms to the Automotive Safety Integrity Level (ASIL) safety requirements defined by the International Standards Organization (ISO) 26262. In one aspect, the system conforms to the Aviation (ED-12/DO-178/DO-254).

In one aspect, a convolutional neural network (CNN) implements a supervised training mode, classifying the static object(s) detected in the visual imagery data to pre-defined labels. The classifier(s) can identify, and label target static objects depicted in the visual imagery data, for example, specific tire sizes as listed on the side walls according to industry codes.

Generating a classifier(s) training image set for the target static object requires recognizing specific imagery data, for example, sidewall bulge from broken cords inside a tire, wheel misalignment, tire zipper failure, bulging, center tire wear, shoulder tire wear, feathering, flat spot wear, cupped wear, chunks of missing rubber, deep abrasions from hitting curbs, various cuts, or cracks in the rubber, nails or screws in tires, or other known tire failures common to the industry and/or the like. To improve generalization and avoid over-fitting, the training image set collects, constructs, adapts, augments and/or transforms to present features of the static objects in various types, sizes, view angles, colors and/or the like.

In one aspect, a support vector machine (SVM) and/or the like classifies the static object(s) detected in the visual imagery data to predefined labels. In one aspect, statistical pattern matching uses the system to store the results of a plurality of products and plurality of defects, recognizing thresholds of acceptable minor deviations without flagging errors. In another aspect, template matching compares captured image pairs with the image of perfect, non-defective image. The system first learns about all the correct attributes of a certain part of the item and then assesses the quality of a produced item according to the estimated standards.

In one aspect, the system uses pattern matching, storing information of both the good and the bad tires, comparing, and contrasting the captured tire pattern versus stored patterns, Feature matching by calculating stereo disparity, identifies the range or depth including visual edges in the stereo image pair. For example: detection of multiple features uses stereo disparity calculates each feature pair determining depth by interpolation. In one aspect, block matching algorithms for estimating depth from stereo images include dividing each stereo pair of images into pairs of blocks or windows and matching each pair of windows to determine stereo disparity. Matching windows between pairs of stereo images can include determining similarity between the windows. Determining similarity can include block matching using different similarity measures using a sum squared differences equation.

Depth map estimation techniques use a pair of stereo images and require stereo disparity calculations on a pixel-by-pixel basis along epipolar lines passing through both stereo images. Calculating stereo disparity requires comparing each pixel from a first stereo image with the epiline from the second stereo image to determine a match and vice versa. Determining a match can include minimizing a cost or difference function between the pixels. Determining the displacement of a pixel along epipolar lines in stereo images can determine stereo disparity of the pixel. Disparity epipolar geometry, image rectifcation, calibration techniques and stereo matching strategies are explained in the reference "DISTANCE ESTIMATION FROM STEREO VISION: REVIEW AND RESULTS" Department of the Computer Engineering California State University, Sacramento by Sarmad Khalooq Yaseen which is incorporated by reference. Depth accuracy measurements are shown in the reference "Method for measuring stereo camera depth accuracy based on stereoscopic vision" by Mikko Kytö*, Mikko Nuutinen, Pirkko Oittinen, Aalto University School of Science and Technology, Department of Media Technology, Otaniementie 17, Espoo, Finland which is incorporated by reference.

In another alternative, Deep Learning methods distinguish between tire tread 550 wear and side wear conditions. In one aspect, Deep Learning methods distinguish between acceptable and safe inner and outer tire sidewalls versus a damaged inner and/or outer tire sidewall. In some cases, the system may implement TensorFlow object detection application programming interfaces. In other cases, the system may implement Keras Deep Learning software.

Computer program instruction code can implement or support each block of the flowchart illustrations, and/or block diagrams, and combinations of blocks in the flowchart illustrations. Computer program instruction code executes on a processor of a general-purpose computer, special purpose computer, or other programmable data processing apparatus to produce a machine, such that the instruction code, which execute via the processor of the computer or other programmable data processing apparatus, create means for implementing the functions/acts specified in the flowchart, flow diagram, and/or block diagram block or blocks.

Figure 6:
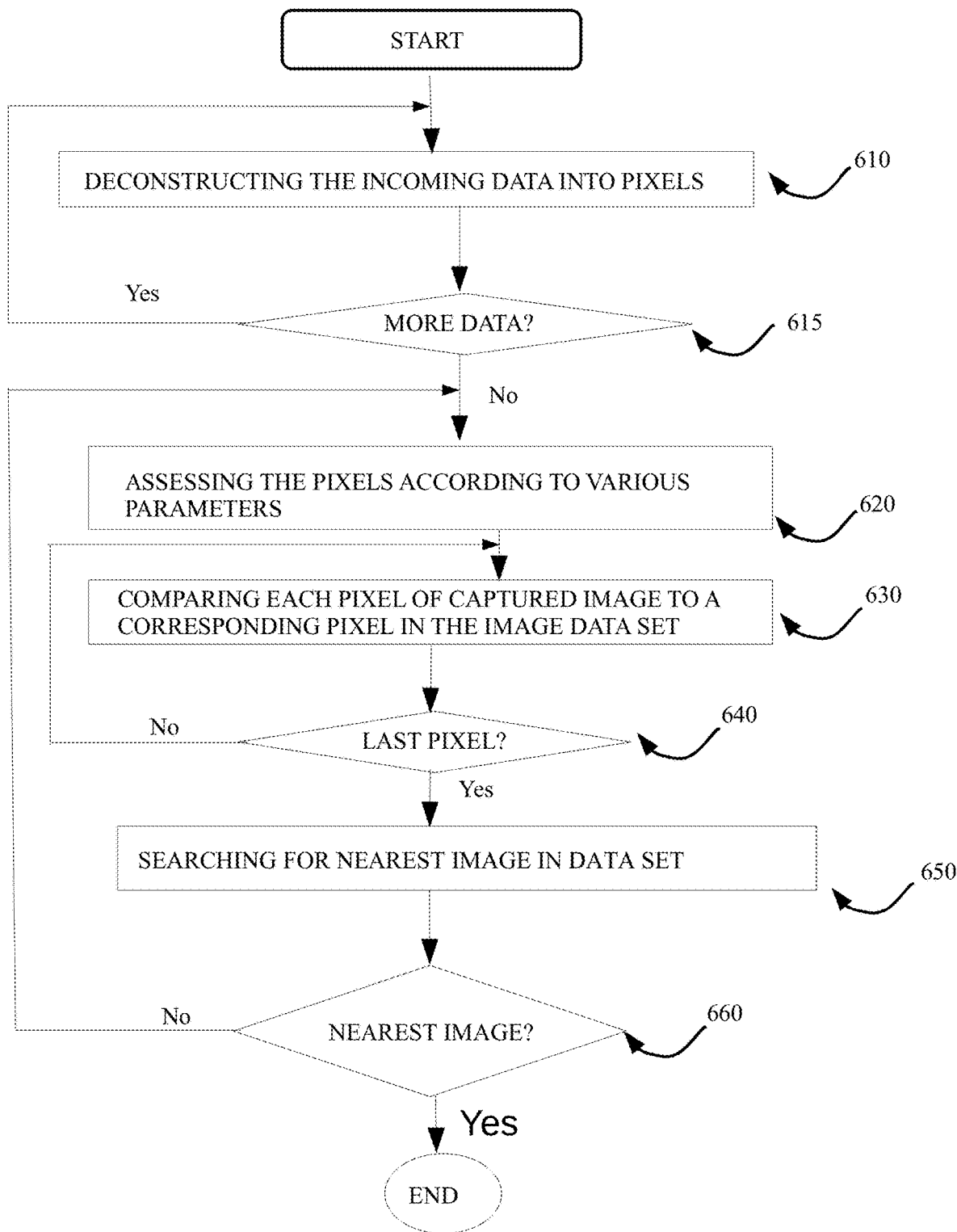
FIG. 6 is a flow diagram illustrating an example pixel-by-pixel algorithm for defect detection.

Referring now to FIG. 6, a flow diagram is shown illustrating an example method of inspecting tire defects, tire damage, or excessive tire wear detection using an image processing software algorithm. A first step of the flow diagram deconstructs the incoming visual data into pixels and parses incoming pixels for generating structures of rows, columns, or frames of video data. (step 610). Next, check if more pixels are incoming for the structure (step 615). If the check does not receive the last pixel of the structure, the method returns to step 610. If it is the last pixel of the structure, the method continues to assess the pixels according to various parameters (step 620). In the following step, the method is comparing each pixel to a corresponding pixel in the images data set (step 630). Comparing pixels continues until the last pixel. This last pixel may be the last pixel of a frame, row, line, or other given quantity in a data structure. A first check counts to determine if it reaches the last pixel (step 640). If it is not the last pixel, the method returns to step 610. If it is the last pixel, the method continues to validate the prediction by searching for the nearest image in the data set (step 650). A second method check determines if the method finds the nearest image (step 660). According to one case, the method iterates a finite number of loops through the image data set using a programmable value for the loop value. If it does not find the nearest image in step 660, the method returns to step 620 iterating searches and finding the nearest image in the data set. The method ends when validating a match.

Figure 7:
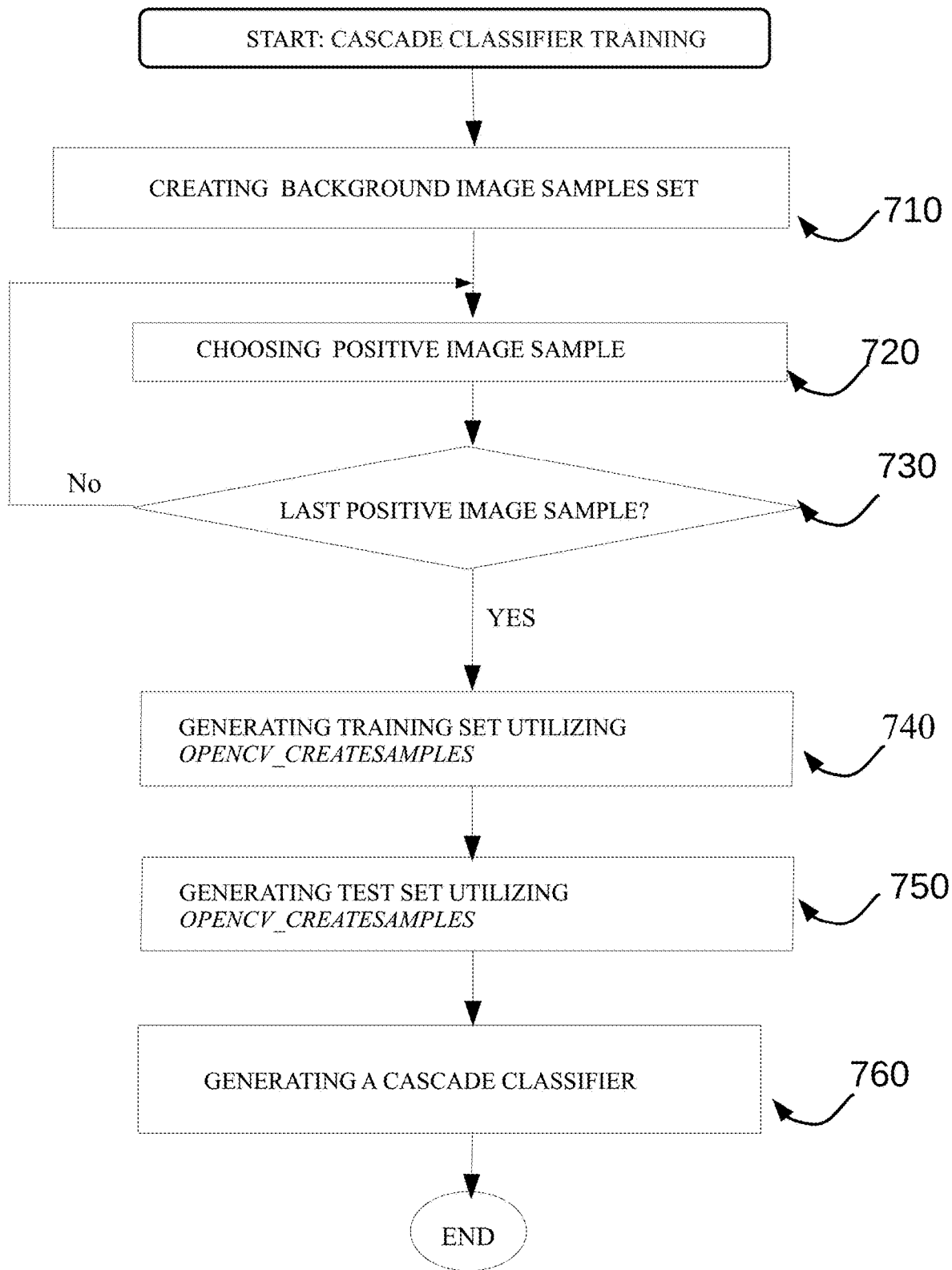
FIG. 7 is a flow diagram for cascade classifier training utilizing OpenCV for defect detection.

Referring now to FIG. 7, a flow diagram for cascade classifier training using OpenCV is shown. A first step of the flow diagram creates a set of background image samples (step 710). The image samples set comprises a text file corresponding to a JPEG image for each line of the text file. A file directory stores a set of background images pointed to by the image samples text file. A design aim is for the background image sample size to be greater than a training window size. Next, select a positive image in step (720). The method selects a positive image from a defect: such as sidewall bulge from broken cords inside a tire, wheel misalignment, tire zipper failure, bulging, center tire wear, shoulder tire wear, feathering, flat spot wear, cupped wear, chunks of missing rubber, deep abrasions from hitting curbs, various cuts, or cracks in the rubber. Next, check for the last positive image (step 730). If it is not the last positive image, the flow diagram returns to step 720. If it is the last positive image, the flow diagram continues to the generation of a training set by execution of the opencv createsamples utility (step 740). In this step, use programmable arguments to generate a training set of PNG format images. The programmable arguments enlarge the set of positive samples of objects by rotating each sample object randomly. These rotations increase variations of the light intensity of pixels for threshold by height, width, and background-color. Therefore, rotation angles of the sample objects in the x, y, and z directions are used to enlarge the set. Multiplication of each positive image by substantial permutations increases the positive image data set. The range of randomness and number of permutations is programmable by the arguments. Next, the opencv_createsamples utility generates a test set of JPEG format images using the specific training set arguments (step 750). Next, the Cascade Training uses the opencv_trainscascade application to generate the classifiers (step 760) and thereafter the flow diagram for cascade classifier training ENDs.

Figure 9:
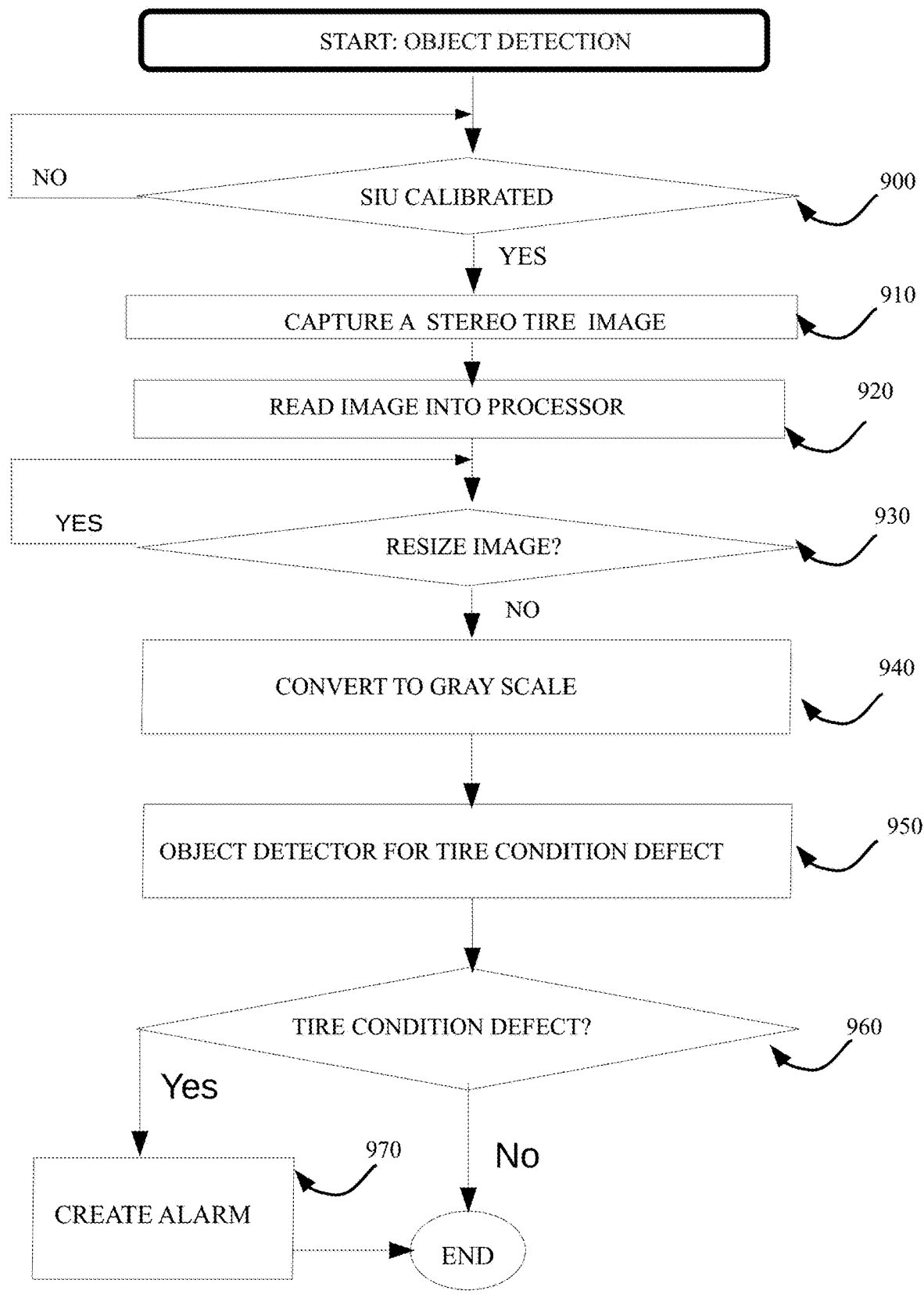
FIG. 9 is a flow diagram illustrating object detection.

Referring now to FIG. 9, the flow diagram shows an object detection method. The first step checks the SIU calibration status (step 900), If not, the method returns to the step 900 and performs a calibration. If calibrated, the method continues to step 910 and captures a stereo tire image. The image is then read into a processor (step 920). A second check then determines if the image requires resizing (step 930). If it the image does requires resizing, the flow diagram returns to step 920 and loops until verifying the correct image. If not, the flow diagram continues to convert the image to gray scale (step 940). Then, the object detector searches for a tire condition defect is executes, If yes, the method captures a stereo tire image of the defect (step 950). The flow diagram then executes a third check for the detection of a tire condition defect (step 960). If a tire condition defect exists, the flow diagram continues to create an alarm (970). If not, the method ends.

An original equipment manufacturer (OEM) may implement the image processing code on a limited tire data set is the reduction of development and testing costs. The image processing code can identify tire type by a DOT code and reference a tread and training set. It is unnecessary to recognize every tire tread manufactured, or every tire code, DOT code or International Organization for Standardization metric tire code. The OEM can process a limited image defect library training set capable of recognizing tire wear and potentially dangerous tire conditions wherein a display 130 could alert the vehicle operator. In one aspect, optical character recognition (OCR) methods recognize tire codes using three-dimensional imaging and edge detection, solving problems recognizing DOT codes having same black lettering, text.

An additional aspect comprises the image recognition of tire codes for accessing manufacture recalls listed in online databases. The manufacture recall may trigger display warnings to replace tires. Access to the manufacture recalls database may comprise a network connection for daily checking. The IPHWCU and/or the OBD may log compliance verification to non-volatile memory for servicing and insurance policy compliance. An additional aspect is the recognition of date tire codes for expiration dates. Industry and safety standards define tire aging and tire replacement. Date codes can trigger display warnings and the IPHWCU and/or the OBD may save the information to non-volatile memory for servicing and insurance policy compliance. Additionally, documenting tire safety inspections may provide legal protection in the event of a lawsuit and the shielding of vehicle owners from frivolous lawsuits. In some cases of the invention, network storage may further include one or more data repositories storing information associated with one or more vehicles. Vehicle the data storage 122 may include an insurance information data repository, a tire defect diagnostic code data repository, and/or other data repositories. For example, the insurance information data repository may store information corresponding to one or more insurance policies (e.g., vehicle insurance policies, etc.) such as a policy identifier, a name of one or more insured parties associated with a vehicle, an address associated with the one or more insured parties, one or more vehicle identifiers associated with the insured individual(s), preferences information, a policy type (e.g., a personal insurance policy, a commercial insurance policy), and/or the like.

Figure 10:
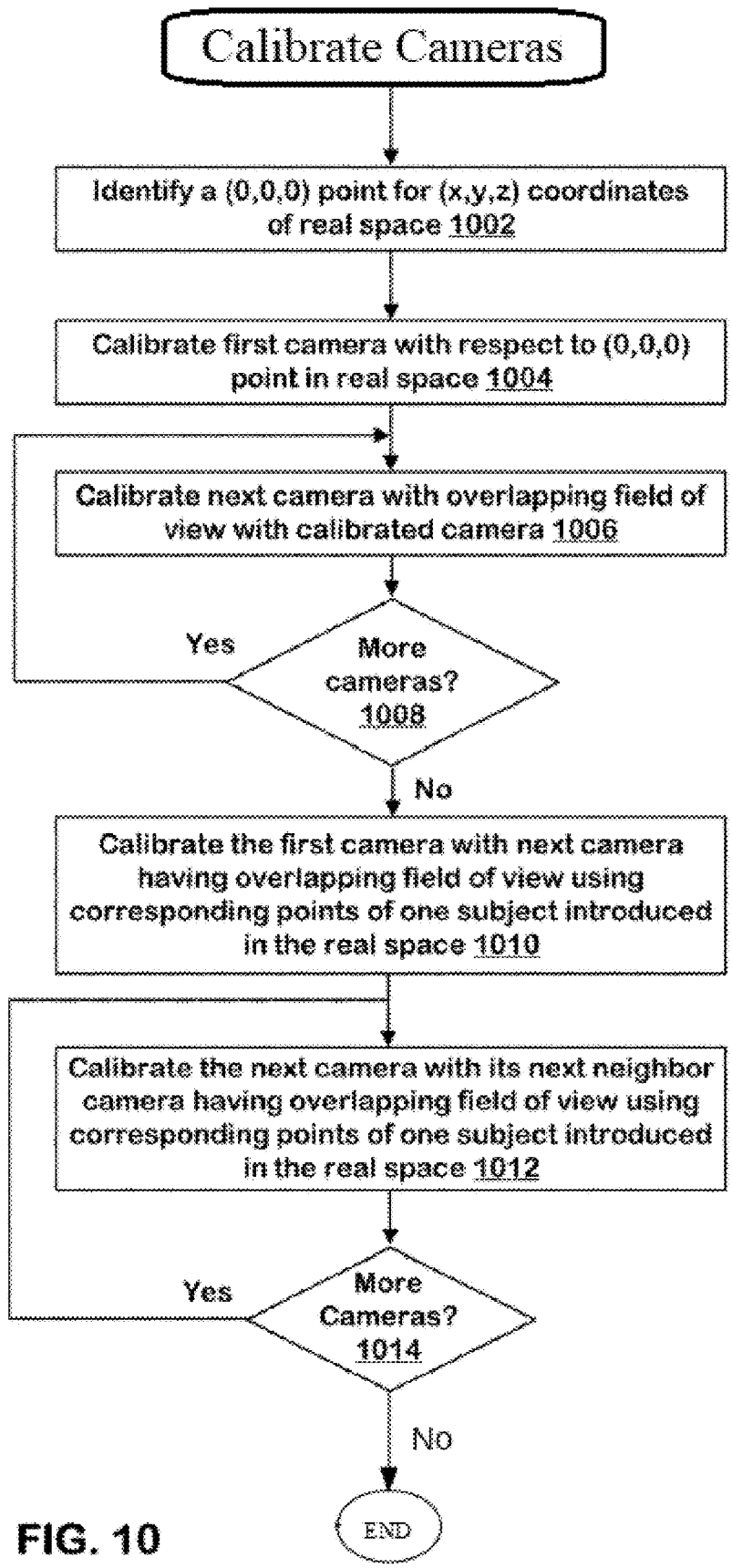
FIG. 10 is a diagram showing a camera calibration.

Referring now to FIG. 10 shows a flowchart illustrating a calibration process 1000. The calibration process starts at step 1002 by identifying a (0, 0, 0) point for (x, y, z) coordinates of the real space. At step 1004, a first camera with the location (0, 0, 0) in its field of view is calibrated. More details of camera calibration are presented earlier in this application. At step 1006, a next camera with overlapping field of view with the first camera is calibrated. At step 1008, it is checked whether there are more cameras to calibrate. The process is repeated at step 1006 until all cameras are calibrated. In a next process step 1010, a tire subject is introduced in the real space to identify conjugate pairs of corresponding points between cameras with overlapping fields of view. Some details of this process are described above. The process is repeated for every pair of overlapping cameras at step 1012. The process ends if there are no more cameras at step 1014.

What is claimed is:

1. An apparatus, comprising:
    an integration of a stereoscopic imaging unit and an image processing and hardware control unit (SIU & IPHWCU) for a self-contained unit mounted on a vehicle, configured to couple visually with a vehicle tire and operative to capture at least one three-dimensional tire tread image pair;
    an image processing code operative to process the at least one three-dimensional tire tread image pair for a tire inspection and a detection of tire condition defects;
    a program instruction code operative to run the image processing and hardware control unit and host the image processing code, wherein the program instruction code provides hardware circuit interfaces drivers to communicate with the stereoscopic imaging unit and other interface circuits; and
    a code configured to execute a service request upon the detection of tire condition defects, wherein the service request triggers a vehicle tire maintenance operation;
    wherein at least one SIU & IPHWCU is operative to couple over a physical transmission media with at least one on board diagnostics (OBD) unit;
    wherein the SIU and IPHWCU is operative to couple over the physical transmission media couple to a vehicle control unit; and
    wherein the vehicle control unit comprises: steering control units, generic vehicle computer units, and transmission control units;
    wherein the vehicle control unit can act as a master controller for the vehicle and the SIU & IPHWCU can act as a peripheral device.

2. The apparatus according to claim 1, wherein the physical transmission media comprises HDBaseT signaling.

3. The apparatus according to claim 1, wherein the image processing code executes on a non-real-time image processor for leveraging a minimum amount of processing power to analyze stereo image pairs for high volume production efficiency and lower manufacturing costs.

4. The apparatus according to claim 2, wherein the physical transmission media further couples to a 5G radio frequency (RF) communications unit, wherein the 5G radio frequency (RF) communications unit is operative to communicate with an external network.

5. The apparatus according to claim 1, further comprising an optics lens cover to protect optics in the stereoscopic imaging unit from dirt, grease, grime, and filth, wherein a movable mechanism closes the optics lens cover by default and opens the optics lens cover to expose the optics during an image capture.

6. A method of imaging and inspection of a vehicle tire comprising:
    capturing at least one three-dimensional image pair of the vehicle tire by a stereoscopic imaging unit and operative to transfer the at least one three-dimensional image pair to at least one image processor and hardware control unit (IPHWCU);

processing at least one three-dimensional image pair of the vehicle tire in at least one IPHWCU utilizing image processing software for inspecting tires;

detecting a tire condition defect in the at least one three-dimensional image pair of the vehicle tire;

and triggering a service request for a tire maintenance service;

wherein a vehicle ownership is selected from a group consisting of: a federal agency, state, county, local government, private ownership, and corporate entity;

wherein a vehicle is a non-autonomous vehicle, or the vehicle is an autonomous self-driving vehicle;

wherein triggering the service request for the tire maintenance service is saved in an optional onboard diagnostics (OBD), where an OBD configuration receives data from one or more IPHWCU for generation of one or more diagnostic codes associated with one or more vehicle tire inspections and the OBD is operative for storing tire inspection results in a non-volatile memory;

wherein the OBD may log compliance verification to the non-volatile memory for servicing and insurance policy compliance.

7. A tire inspection apparatus mounted onboard a vehicle operating, comprising:
   a stereoscopic imaging unit (SIU) and an image processing and hardware control unit (IPHWCU) mounted on a vehicle with a mounting hardware, the SIU configured to couple visually with a vehicle tire for monitoring a tire status and operative to capture at least one three-dimensional tire tread image pair and capture at least one three-dimensional tire inner sidewall image pair and at least one three-dimensional tire outer sidewall image pair; and
   an image processing code to inspect a tire tread, an inner tire sidewall, and an outer tire sidewall for damage, wear, defects, and text, the image processing code configured to detect tire damage, wear, defects, and text for execution of a service request to trigger a vehicle tire maintenance operation;

wherein the mounting hardware further comprises a stepper motor or a direct-current motor to enable mechanical movements for positioning and aiming of image sensors; and wherein the mechanical movements comprise an element selected from a group comprising: (1) an epicyclic train allowing for adjusting an angular image capture of the tire tread, inner tire sidewall, and outer tire sidewall or sidewall; (2) a rectilinear slide motion, whereby a screw guides the image sensors to a more favorable FOV position; and (3) a wheel to produce rotary motion from a circular motion of a screw for guiding the image sensors;

wherein the SIU includes a plurality of two or more image sensors.

8. The tire inspection apparatus according to claim 7, further comprising an image processing code for image recognition of the text for tire codes to access manufacture recalls listed in online databases and image recognition of date tire codes for expiration dates to trigger warnings to replace tires.

9. The tire inspection apparatus according to claim 7, further comprising a data storage comprising:
   an insurance information data repository to store information corresponding to one or more vehicle insurance policies comprising a policy identifier; a name of one or more insured parties associated with a vehicle; an address associated with the one or more insured parties; one or more vehicle identifiers associated with one or more insured individuals; preferences information; a personal insurance policy or a commercial insurance policy; and
   a tire defect diagnostic code data repository.

10. The tire inspection apparatus of claim 7, wherein monitoring is a real-time monitoring.

* * * * *